(12) United States Patent  
Chen

(10) Patent No.: US 8,719,558 B2  
(45) Date of Patent: May 6, 2014

(54) DISTINGUISHING CIRCUIT

(75) Inventor: Chun-Sheng Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 126 days.

(21) Appl. No.: 13/459,127

(22) Filed: Apr. 28, 2012

(65) Prior Publication Data

US 2013/0151827 A1    Jun. 13, 2013

(30) Foreign Application Priority Data

Dec. 12, 2011  (CN) .......................... 2011 1 0411725

(51) Int. Cl.
*G06F 9/00* (2006.01)
*G06F 9/24* (2006.01)
*G06F 15/177* (2006.01)

(52) U.S. Cl.
USPC .................................. 713/1; 713/2; 713/100

(58) Field of Classification Search
USPC .................................................. 713/1, 2, 100
See application file for complete search history.

(56) References Cited

U.S. PATENT DOCUMENTS 5,421,006 A * 5/1995 Jablon et al. .................... 714/36
6,038,663 A * 3/2000 Feldman ........................... 713/1
6,047,373 A * 4/2000 Hall et al. ......................... 713/1

* cited by examiner

*Primary Examiner* — Mark Connolly
(74) *Attorney, Agent, or Firm* — Novak Druce Connolly Bove + Quigg LLP

(57) ABSTRACT

A distinguishing circuit includes first to fifth resistors, a front panel connector, and a jumper. The front panel connector includes first to tenth pins. When the ninth pin is connected to the tenth pin through the jumper, a BIOS (Basic Input Output System) chip will determine whether a computer system is a first type. When the eighth pin is connected to the tenth pin through the jumper, the BIOS chip will determine whether the computer system is a second type.

1 Claim, 2 Drawing Sheets

DISTINGUISHING CIRCUIT

BACKGROUND

1. Technical Field

The present disclosure relates to a distinguishing circuit for a BIOS (Basic Input Output System) chip.

2. Description of Related Art

When designers design a computer system, a plurality of computer systems with different peripheral devices are designed simultaneously. For example, a first type of computer system will include an optical disk drive, and a second type of computer system will include a floppy disk drive. The other components of the first and second types of computer systems may be the same. As a result, programs loaded in BIOS chips in the first and second types of computer systems will be different.

In current computer system, the BIOS chip reads signals Chassis_ID1 and Chassis_ID2 to distinguish the first and second types of computer systems. Referring to FIG. 2, a distinguishing circuit includes four resistors R1, R2, R3, and R4. A 3 volt power supply +3V is grounded through the resistors R1 and R2 connected in series. The 3 volt power supply +3V is further grounded through the resistors R3 and R4 connected in series. A node between the resistors R1 and R2 is connected to a BIOS chip 100 for outputting the signal Chassis_ID1. A node between the resistors R3 and R4 is also connected to the BIOS chip 100 for outputting the signal Chassis_ID2.

When the computer system is the Chassis ID1 type, the resistors R2 and R3 are taken off. At this time, the signal Chassis_ID1 is received by the BIOS chip 100 at a high level, and the signal Chassis_ID2 is received by the BIOS chip 100 at a low level. The BIOS chip 100 determines that the computer system is the first type (Chassis ID1), and loads corresponding programs. When the computer system is the second type (Chassis ID2), the resistors R1 and R4 are taken off. At this time, the signal Chassis_ID1 received by the BIOS chip 100 is at a low level, and the signal Chassis_ID2 received by the BIOS chip 100 is at a high level. The BIOS chip 100 determines that the computer system is the second type, and loads corresponding programs.

The distinguishing circuit of related art, as described above, requires designers to design different motherboards to meet different types of computer systems. This is inconvenient.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
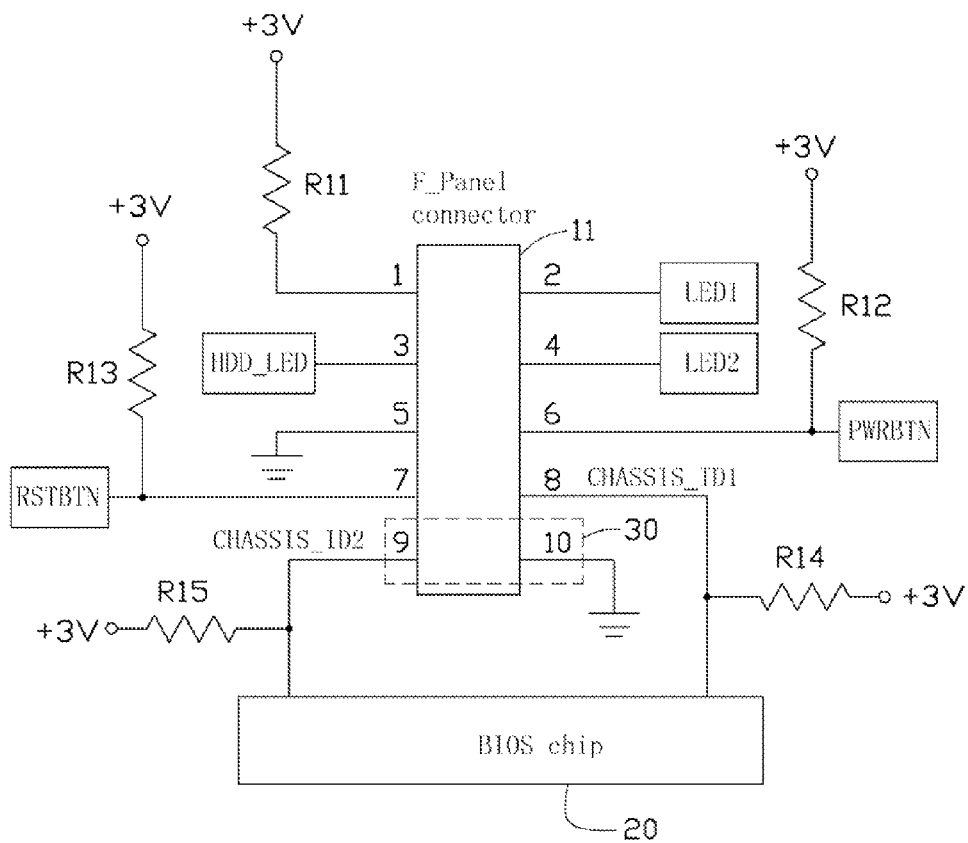
FIG. 1 is a circuit diagram of an exemplary embodiment of a distinguishing circuit.
Figure 2:
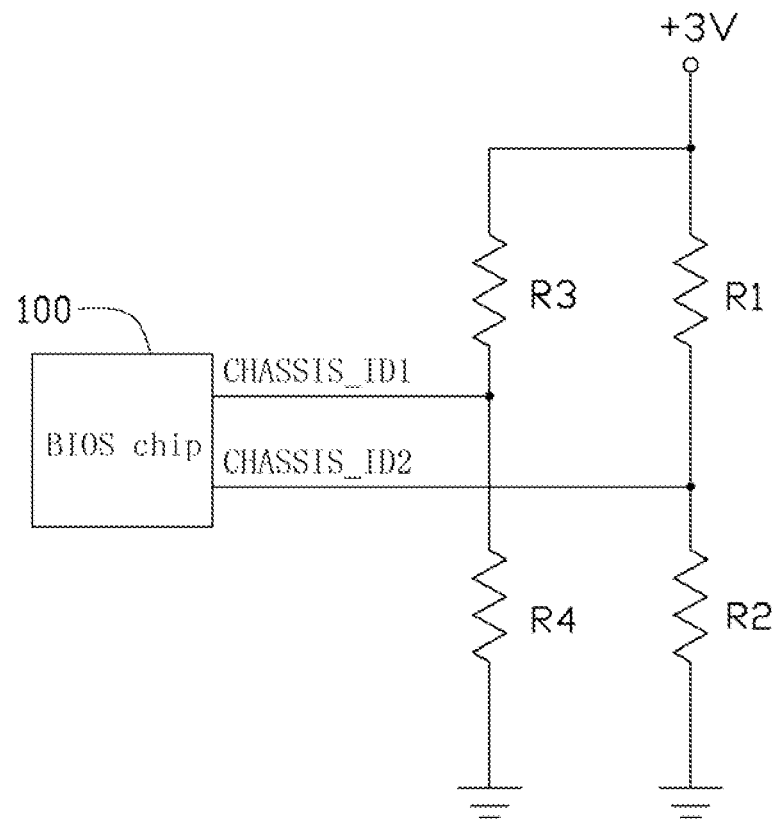
FIG. 2 is a circuit diagram of a conventional distinguishing circuit.

Referring to FIG. 1, an exemplary embodiment of a distinguishing circuit includes five resistors R11, R12, R13, R14, and R15, and a front panel (F_Panel) connector 11.

A first pin 1 of the front panel connector 11 is connected to a 3 volts power supply +3V from a motherboard through the resistor R11. A second pin 2 of the front panel connector 11 is connected to a first light LED1. A third pin 3 of the front panel connector 11 is connected to a hard disk drive light HDD_LED. A fourth pin 4 of the front panel connector 11 is connected to a second light LED2. A fifth pin 5 of the front panel connector 11 is grounded. A sixth pin 6 of the front panel connector 11 is connected to the 3 volts power supply +3V through the resistor R12. The sixth pin 6 is further connected to a power button PWRBTN. A seventh pin 7 of the front panel connector 11 is connected to the 3 volts power supply +3V through the resistor R13. An eighth pin 8 of the front panel connector 11 is connected to the 3 volts power supply +3V through the resistor R14. The eighth pin 8 is also connected to a BIOS chip 20 for outputting a signal Chassis_ID1 to the BIOS chip 20. A ninth pin 9 of the front panel connector 11 is connected to the 3 volts power supply +3V through the resistor R15. The ninth pin 9 is also connected to the BIOS chip 20 for outputting a signal Chassis_ID2 to the BIOS chip 20. A tenth pin 10 of the front panel connector 11 is grounded.

In this embodiment, when the signal Chassis_ID1 is at a high level, and the signal Chassis_ID2 is at a low level, the BIOS chip 20 determines that the computer system is a first type. When the signal Chassis_ID1 is at a low level, and the signal Chassis_ID2 is at a high level, the BIOS chip 20 determines that the computer system is a second type.

Therefore, when the computer system is the first type, the ninth pin 9 and the tenth pin 10 of the front panel connector 11 may be connected together through a jumper 30. At this time, the signal Chassis_ID1 received by the BIOS chip 20 is at a high level, and the signal Chassis_ID2 received by the BIOS chip 20 is at a low level. The BIOS chip 20 will determine that the computer system is the first type. When the computer system is the second type, the eighth pin 8 and the tenth pin 10 of the front panel connector 11 may be connected together through the jumper 30. At this time, the signal Chassis_ID1 received by the BIOS chip 20 is at a low level, and the signal Chassis_ID2 received by the BIOS chip 20 is at a high level. The BIOS chip 20 will determine that the computer system is the second type.

The distinguishing circuit can make the BIOS chip 20 distinguish between different types of computer systems by means of the jumper 30. Compared with the conventional distinguishing circuit, the distinguishing circuit in this embodiment is far more convenient.

The foregoing description of the exemplary embodiments of the disclosure has been presented only for the purposes of illustration and description and is not intended to be exhaustive or to limit the disclosure to the precise forms disclosed. Many modifications and variations are possible in light of everything above. The embodiments were chosen and described in order to explain the principles of the disclosure and their practical application so as to enable others of ordinary skill in the art to utilize the disclosure and various embodiments and with such various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than by the foregoing description and the exemplary embodiments described therein.

What is claimed is:

1. A distinguishing circuit comprising:
   first to fifth resistors;
   a front panel connector comprising first to tenth pins, wherein the first pin is connected to a power supply of a computer system through the first resistor, the second pin is connected to a first light emitting diode the third pin is connected to a hard disk drive light, the fourth pin is connected to a second light emitting diode, the fifth pin is grounded, the sixth pin is connected to the power supply through the second resistor, the sixth pin is further connected to a power button, the seventh pin is connected to the power supply through the third resistor, the eighth pin is connected to the power supply through the fourth resistor, the eighth pin is further connected to a BIOS (Basic Input Output System) chip of the computer system, the ninth pin is connected to the power supply through the fifth resistor, the ninth pin is further connected to the BIOS chip, the tenth pin is grounded; and
   a jumper, wherein when the ninth pin is connected to the tenth pin through the jumper, the BIOS chip determines that the computer system is a first type; when the eighth pin is connected to the tenth pin through the jump, the BIOS chip determines that the computer system is a second type.

* * * * *